Aug. 21, 1956   R. L. PATE   2,759,362
SAMPLER CUTTER
Filed Jan. 10, 1955   2 Sheets-Sheet 1

INVENTOR.
Robert L. Pate,
BY

Aug. 21, 1956
R. L. PATE
2,759,362
SAMPLER CUTTER
Filed Jan. 10, 1955
2 Sheets-Sheet 2
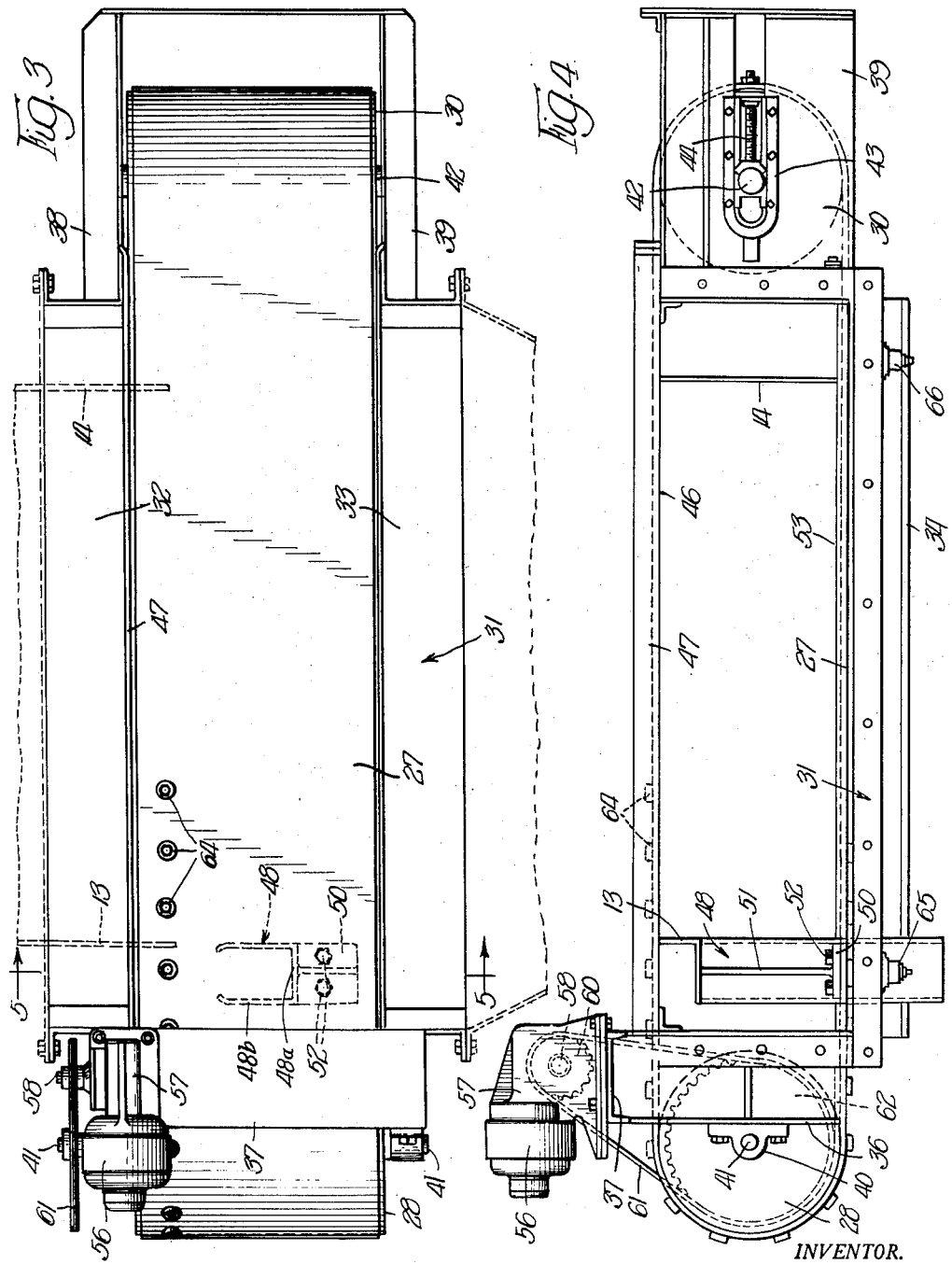
INVENTOR.
Robert L. Pate,
BY
Wilkinson Hulley Byrn & Hume
Attys.

United States Patent Office 2,759,362
Patented Aug. 21, 1956

2,759,362
SAMPLER CUTTER

Robert L. Pate, Pittsburg, Kans., assignor to The McNally Pittsburg Manufacturing Corporation, Pittsburg, Kans., a corporation of Kansas Application January 10, 1955, Serial No. 480,893

6 Claims. (Cl. 73—423)

The invention relates to sampling apparatus and has reference in particular to sampling apparatus for sampling material flowing as a continuous stream in a chute or the like and which may have operation to divert a representative sample from the flowing stream of material, either periodically at spaced intervals, or at any desired time.

One of the objects of the invention is to provide new and improved apparatus for sampling materials which are being supplied in a continuous stream, the said sampling apparatus including a cutter having movement transversely across the stream for diverting a portion of the same for sampling purposes, and wherein the material may be a liquid, a semi-liquid, or may be a solid such as coal.

A more specific object of the invention resides in the provision of a sampler cutter which is fixed to an endless belt and which therefore is caused to travel upon movement of the belt. During operation of the apparatus a stream of material is caused to pass between the belt runs so that the sampler cutter will thus move across the flowing stream and in so doing will divert a representative sample for analyzing purposes.

Another object of the invention is to provide a sampler cutter having a fixed relation with an endless belt, said belt being disposed transversely with respect to the stream of flowing material so that the material passes through the belt runs, and wherein provision is made to prevent the material from working its way underneath that portion of the belt carrying the sampler cutter.

A further object is to provide an endless belt mechanism for a sampler cutter of the character described which will include novel means fixed to the belt and a structural member disposed between the end pulleys for supporting that portion of the belt to which the sampler cutter is secured so that the belt is relieved of the weight of the cutter and is accordingly maintained in proper alignment on the end pulleys.

Another object is to provide endless belt mechanism for a sampler cutter of the character described which can be conveniently associated with a metal chute through which a stream of material is caused to flow, wherein oscillating movement of the belt to cause the cutter to travel forward and rearward across the stream of flowing material is made automatic by means of limit switches, and wherein the mechanism can be set for any desired speed of travel for the cutter and for operation with any desired interval between forward and rearward travel thereof.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 3 is a view of the endless belt mechanism for the sampler cutter illustrating further constructional details of the apparatus and showing the cutter in an inoperative position with respect to the material delivery chute;

Figure 4 is an edge view of the endless belt mechanism shown in Figure 3; and

Figure 1:
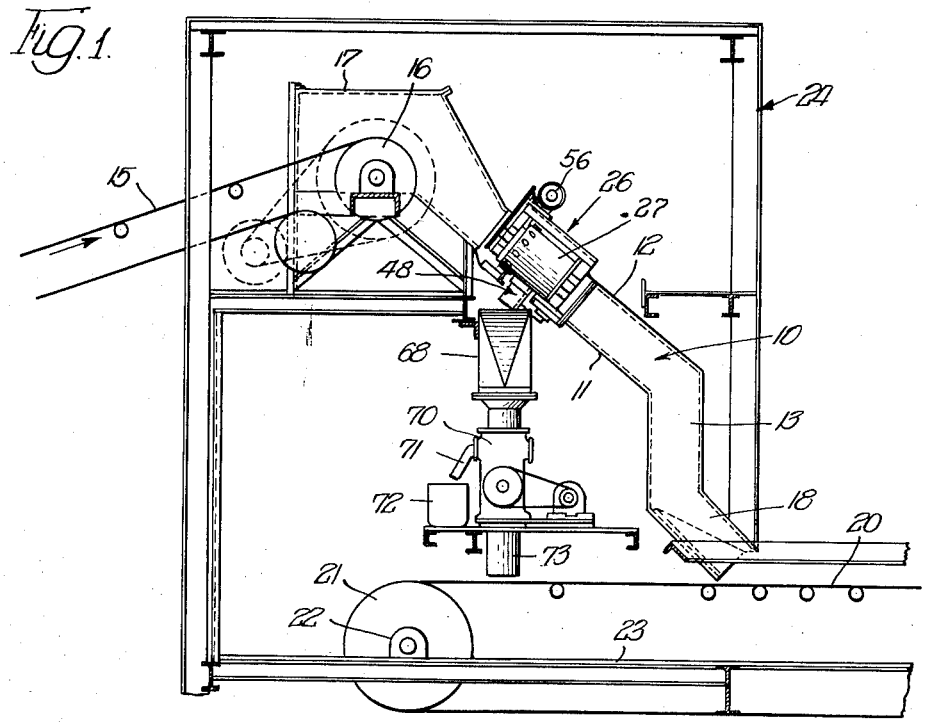
Figure 1 is a side elevational view showing an installation for delivering material by means of a chute, the said chute being equipped with a sampler cutter embodying the improved features of the invention.

In Figure 1 of the drawings the endless belt mechanism for the sampler cutter is shown in operative association with a delivery chute identified in its entirety by numeral 10, Figure 1, and which receives coal or other material at its upper end and discharges the same at its lower end. Said chute 10 includes a bottom wall 11, a top wall 12, and side walls 13 and 14. The chute is supplied with material by belt conveyor 15, the discharge end of which is formed by pulley 16 having location within the housing 17 constituting part of chute 10. The discharge end 18 of the chute is disposed above the conveyor belt 20 which extends horizontally so that the material from the chute discharges onto the conveyor belt 20 and continues its movement through the plant. At this receiving end of conveyor belt 20 the said belt passes over pulley 21, supported for rotation by bearings 22 which are fixed to the beams 23 of framework 24 comprising the building or enclosure for the apparatus of the invention including the various auxiliary devices associated therewith.

The endless belt mechanism 26 of the sampler cutter of the invention is interposed in chute 10, and the said mechanism is so combined with said chute that the sampler cutter is caused to travel across the stream of material flowing in the chute and thus the cutter diverts a representative portion of the stream for sampling purposes.

Referring more particularly to Figures 2, 3, 4 and 5, the endless belt mechanism 26 consists essentially of an endless belt 27 which may be fabricated of rubber or similar material, or the belt may be of laminated formation with an inside layer of rubber and with an outside layer of another material for stiffening or strengthening the belt. The endless belt 27 passes over end pulleys 28 and 30 which are suitably journalled by the frame structure 31. Said structure includes the upper and lower members 32 and 33, respectively, which are in turn bolted to the upper and lower sections of the chute 10 and which therefore join with and connect the sections of the chute to provide a continuous passageway for the flow of the material delivered to the chute by the conveyor 15. Said frame structure 31 additionally includes the beam 34, Figures 2 and 5, which extends parallel to that belt run to which the cutter is secured and which is provided for the purpose of supporting said portion of the belt as will be presently described in further detail. Other elements constituting the frame structure include the end beams 35, 36 and 37, Figure 2, at the motor end of the mechanism and the members 38 and 39 at the opposite end of the mechanism, see Figure 3.

The beams 35 and 36 each carry a bracket 40, said brackets being disposed in alignment for journalling the shaft 41 of the end pulley 28. The shaft 42 of the end pulley 30 is journalled respectively by top and bottom devices 43 suitably supported by members 38 and 39, respectively, and it will be observed that each device includes a threaded shaft 44 which renders the device adjustable so that the endless belt 27 can be maintained under proper tension.

Figures 2, 5:
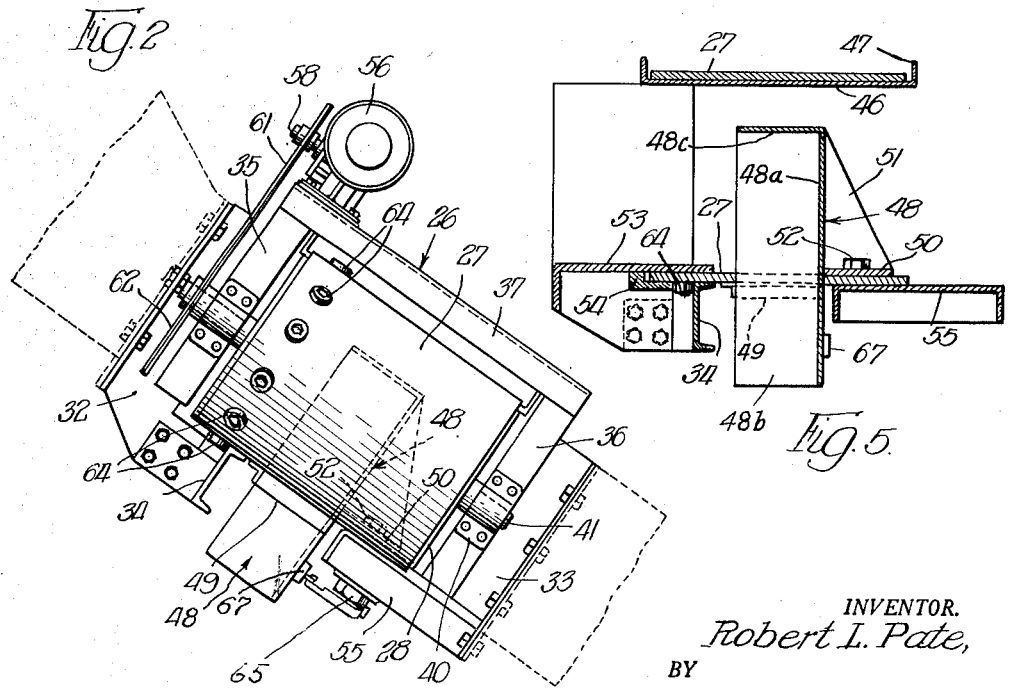
Figure 2 is an end elevational view showing certain constructional details of the endless belt mechanism for effecting travel of the sampler cutter.
Figure 5 is a sectional view taken along line 5—5 of Figure 3 and illustrating in particular the constructional details of the sampler cutter.

In accordance with the invention, the frame structure 31 is closed along the top surface by trough member 46, Figures 3 and 5, the said member receiving the top run of the endless belt 27 and which is accordingly guided by the flanged edges 47 of the trough member. The other run of the endless belt has the cutter 48 affixed thereto for which purpose it is necessary to cut an opening in the belt for receiving the cutter and which is suitably secured to the belt so as to have bodily movement upon movement of the belt. The cutter 48 essentially consists of a rectangular container, open at its top and on one end. In particular the cutter comprises a bottom wall 48a, spaced side walls 48b, and an end wall 48c. For securing the cutter to the belt a flange member 49 is employed and it is preferred that the cutter have a depending foot 50 which may be provided with a center strut 51, the said foot being fixed to the belt by fastening means such as 52. This bottom side of the frame structure is open to permit travel of the cutter 48 in a transverse direction with respect to the stream of flowing material within the chute, although certain structural elements are provided to form a guide for the bottom belt run and which assist in supporting the belt both above and below the cutter. The most important of these elements consists of the inside plate 53 which is part of the upper member 32 of the frame structure. Said inside plate overlaps the bottom run of belt 27, as shown in Figure 5, and at this location said plate forms the inside wall of the chute. Accordingly, this construction prevents the coal or other material flowing through the chute from working its way under the belt, which, of course, could not be permitted under any circumstances. The longitudinal member 54 and the beam 34 are associated with the inside plate 53 in a manner to provide a grooved passageway for the top edge of the lower belt run. The closure plate 55 is secured to the lower member 33 of the frame structure and said plate is located below the cutter 48 so as to have contact with the exterior surface of the belt, whereby said closure plate 55 acts as a retaining wall for supporting this bottom edge of the belt in the vicinity of the sampler cutter.

From the foregoing, it will be understood that the endless belt 27 is associated at its respective ends with pulleys 28 and 30, with the belt being so disposed with respect to the chute that the stream of flowing material passes between the top and bottom belt runs. The sampler cutter 48 is fixed to the bottom belt run so as to extend on both sides of the belt, whereby the rear portion of the sampler is located within the chute and the discharge end is located exteriorly in order to discharge the material diverted by the cutter. To cause movement of the endless belt and travel of the cutter rotation can be imparted to the pulley 28 by means of the electric motor 56. The motor 56 and speed reducing mechanism 57 comprise a unit which is suitably bolted to and supported by beam 37. The shaft 58 of the speed reducing mechanism is provided with the driving sprocket 60 and said driving sprocket through chain 61 has operative connection with sprocket gear 62 suitably fixed to shaft 41 of the pulley 28. Operation of the motor will effect rotation of the end pulley 28 and thus movement of the belt to cause travel of the cutter 48 across the stream of flowing material. Various expedients may be used to assist the belt in supporting the weight of the cutter 48. Unless some means are provided the belt 27 will move downwardly during operation of the mechanism and improper alignment of the belt with the end pulleys will result. The invention provides a plurality of relatively small discs 64 which are fixed to the belt 27 on respective sides of cutter 48 and which are disposed in spaced relation for some distance on each side of the cutter. The discs are adapted to engage with and ride on the beam 34 during travel of the cutter, as clearly illustrated in Figures 2 and 5. This constitutes the major function for the beam 34 for which purpose the beam is located between the end pulleys 28 and 30 and adjacent this bottom run of the belt. Thus the said bottom run is adequately supported during movement since the weight of the cutter is transferred by discs 64 to the beam 34. Accordingly, proper alignment of the endless belt 27 with the end pulleys 28 and 30 is maintained at all times, irrespective of operating conditions.

With the sampler cutter 48 fixed to the belt 27 so as to form a unit therewith, it will be clear that the belt movement will have to be confined to forward and rearward oscillations. This can be conveniently accomplished by a pair of limit switches such as 65 and 66 suitably supported from the closure plate 55 and located at respective ends of the plate. The limit switches are of standard construction and are actuated by a lug or similar projection 67 fixed to the underside of the cutter 48 and disposed in alignment with the limit switches. The said limit switches are electrically connected in circuit with the motor 56 so that upon closing of the circuit to the motor, the motor will be caused to operate in a direction to move the sampler cutter from its position of rest, as shown in Figures 3 and 4, to a position at the opposite side of the chute. When the cutter reaches said opposite side the projection 67 carried thereby will contact limit switch 66, whereupon the electric motor 56 is caused to reverse its direction of rotation. If desired, a time delay device can be incorporated in the electrical connections so that the endless belt 27 does not immediately reverse its direction of movement but does so only after a lapse of a predetermined interval of time. However, eventually the cutter will travel rearwardly and upon reaching its position of rest, projection 67 will contact limit switch 65 to open the circuit and terminate one complete cycle of operation. When the cutter 48 is located in a position of rest, as shown in Figure 3, the said cutter is located beyond the side wall 13 of the chute so that the cutter is inoperative when idle. Likewise, the cutter is inoperative due to its location beyond side wall 14 when it assumes an intermediate position, that is, at the end of its forward travel and before the cutter is caused to travel rearwardly. Due to the provision of limit switches the operation of the sampler cutter is automatic and the same can be set for any desired speed and for operation at any desired time intervals.

Referring again to Figure 1, the cutter 48 delivers the sample of material into the hopper 68 which has a length equal to the extent of travel of the cutter. From the hopper 68 the sample is delivered to crusher 70 which is preferably a conventional piece of equipment, and following operation on the sample a portion of the crushed material is discharged through spout 71 into the sample container 72 provided for the purpose. The remaining portion of the crushed sample is discharged through spout 73 onto the conveyor 20.

The pulleys 28 and 30 for the endless belt mechanism are located outside the chute so that they are conveniently accessible to the operator for maintenance and repair. The unique feature of the invention is the passage of the material between the top and bottom runs of the endless belt, and, by affixing a cutter to the belt, a device is provided which can be caused to cut across the ribbon of flowing material and divert a representative portion of the material as a sample. The overlapping of the inside plate 53 with the bottom run prevents material from working its way under this portion of the belt, and by providing the belt with the small discs the weight of the cutter is substantially supported by the fixed beam 34.

What is claimed is:

1. In sampling apparatus, in combination with a chute through which a stream of material is caused to flow, said chute having a top wall, side walls and a bottom wall provided with a transverse opening, of endless belt mechanism in association with said chute, said mechanism including a pair of pulleys located exteriorly of the chute adjacent respective side walls thereof, an endless belt operatively supported by the pulleys in a manner whereby the runs of the belt respectively coact with the top and bottom walls of the chute and in a manner whereby the bottom run bridges the transverse opening in the bottom wall, a sampler cutter fixed to the said bottom run of the belt, said cutter comprising a member in the form of a hollowed spout extending through the belt and through the transverse opening in the bottom wall, whereby a portion of the cutter is disposed within the chute and the remainder of the cutter is located exteriorly of the chute, and said first mentioned portion of the cutter having an opening therein directed upstream so that the sampler cutter diverts a representative sample of the material as the cutter is caused to travel transversely of the chute upon movement of the belt.

2. Sampling apparatus as defined by claim 1, additionally including a supporting member, means on the belt for coaction with said supporting member for supporting the belt to sustain the weight of the sampler cutter whereby the belt is maintained in proper alignment on said pulleys, and power means for driving one of the pulleys whereby to cause movement of the belt and travel of the sampler cutter.

3. Sampling apparatus as defined by claim 1, additionally including power means for driving one of the pulleys whereby to cause movement of the belt and travel of the sampler cutter, and limit switches located at respective ends of the transverse opening and in electrical connection with said power means for effecting oscillating movement of the belt and back and forth travel of the sampler cutter within said transverse opening.

4. Sampling apparatus as defined by claim 1, wherein the upstream edge of the bottom wall along the transverse opening has overlapping relation with the adjacent edge of the belt whereby to prevent the material flowing in the chute from working its way under the said belt.

5. In sampling apparatus, in combination with a chute through which a stream of material is caused to flow, said chute including a top wall, side walls and a bottom wall having a transverse opening therein, endless belt mechanism associated with the chute, said mechanism including a pair of pulleys located exteriorly of the chute at respective sides thereof, an endless belt operatively supported by the pulleys and driven thereby, said belt having spaced runs disposed parallel to the top and bottom walls of the chute and said bottom run coacting with the bottom wall in a manner to bridge the said transverse opening, a sampler cutter fixed to the bottom run of the belt so that a portion is located within the chute and the remainder is located exteriorly of the chute, said sampler cutter comprising an elongated member including a bottom wall, side walls, and one end wall located within the chute whereby said member has an open discharge end exteriorly of the chute and an open top within the chute and which is directed upstream for diverting a representative sample of the material flowing through the chute, power means for driving one of said pulleys to cause movement of the belt, and limit switches in electrical connection with said power means for effecting oscillating movement of the belt and back and forth travel of the sampler cutter within the said transverse opening.

6. Sampling apparatus as defined by claim 5, additionally including supporting structure in the form of a transversely extending frame member, and means on the belt for coaction with said frame member for supporting the belt to sustain the weight of the sampler cutter whereby the belt is maintained in proper alignment on the said pulleys.

References Cited in the file of this patent
UNITED STATES PATENTS

| | | |
|---|---|---|
| 1,001,129 | Fairchild | Aug. 22, 1911 |
| 1,155,670 | McGregor | Oct. 5, 1915 |
| 1,423,890 | Warner | July 25, 1922 |
| 2,465,454 | Holt | Mar. 29, 1949 |